United States Patent [19]

Gerondale

[11] Patent Number: 4,676,533
[45] Date of Patent: Jun. 30, 1987

[54] REVERSIBLE LOCK AND SEAL APPARATUS

[75] Inventor: Joseph D. Gerondale, Santa Ana, Calif.

[73] Assignee: Tolo, Inc., Santa Ana, Calif.

[21] Appl. No.: 670,755

[22] Filed: Nov. 13, 1984

[51] Int. Cl.⁴ ............................................. F16L 37/08
[52] U.S. Cl. ..................................... 285/158; 285/343; 285/382.7; 285/232; 285/385; 285/332; 285/249
[58] Field of Search ............... 285/343, 158, 161, 348, 285/383, 340, 382.7, 232, 385, 389, 332, 332.1, 330, 342, 248, 249, 255

[56] References Cited

U.S. PATENT DOCUMENTS

| | | | |
|---|---|---|---|
| 1,781,222 | 11/1930 | Fischer | 285/382.7 |
| 1,809,582 | 6/1931 | Church | 285/340 |
| 1,888,343 | 11/1932 | Bohlman | 285/382.7 |
| 1,981,247 | 11/1934 | Pope | 285/158 X |
| 2,064,140 | 12/1936 | Appleton | 285/340 |
| 2,225,208 | 12/1940 | Crickmer | 285/382.7 |
| 2,247,032 | 6/1941 | Norton | 285/382.7 |
| 2,255,673 | 9/1941 | McDermott | 285/382.7 |
| 2,448,888 | 9/1948 | Hynes | 285/382.7 |
| 2,469,851 | 5/1949 | Stecher | 285/382.7 |
| 2,484,192 | 10/1949 | Squiller | 285/382.7 |
| 2,518,661 | 8/1950 | Brushaber | 285/383 X |
| 3,058,762 | 10/1962 | Howe | 285/340 |
| 3,248,136 | 4/1966 | Brozek | 285/382.7 |
| 3,432,189 | 3/1969 | Buller | 285/340 |
| 3,591,208 | 7/1971 | Nicolaus | 285/343 X |
| 3,794,362 | 2/1974 | Mooney | 285/340 |
| 3,888,521 | 6/1975 | O'Sickey | 285/342 |
| 3,917,324 | 11/1975 | Wakatsuki | 285/382.7 |
| 3,972,547 | 8/1976 | Itoya | 285/158 X |
| 4,146,254 | 3/1979 | Turner et al. | 285/383 X |
| 4,181,329 | 1/1980 | Helm | 285/340 |
| 4,258,943 | 3/1981 | Vogt | 285/348 |

FOREIGN PATENT DOCUMENTS

| | | | |
|---|---|---|---|
| 251074 | 9/1962 | Australia | 285/158 |
| 215238 | 5/1961 | Austria | 285/249 |
| 1214802 | 4/1960 | France | 285/248 |
| 380237 | 9/1932 | United Kingdom | 285/340 |
| 2011001 | 7/1979 | United Kingdom | 285/348 |
| 2047832 | 12/1980 | United Kingdom | 285/343 |
| 2060803 | 5/1981 | United Kingdom | 285/343 |

Primary Examiner—Cornelius J. Husar
Assistant Examiner—Eric K. Nicholson
Attorney, Agent, or Firm—Louis J. Bachand

[57] ABSTRACT

A reversible lock and seal apparatus for coupling swimming pool piping and fittings, comprising a frusto-conical U-cross section metal ring with longitudinally spaced circular rows of teeth, adapted to be cammed into piping by a follower coupled to the fitting for locking the piping to the fitting without need of piping threads or solvent cements, and squeezing a seal ring therebetween.

10 Claims, 2 Drawing Figures

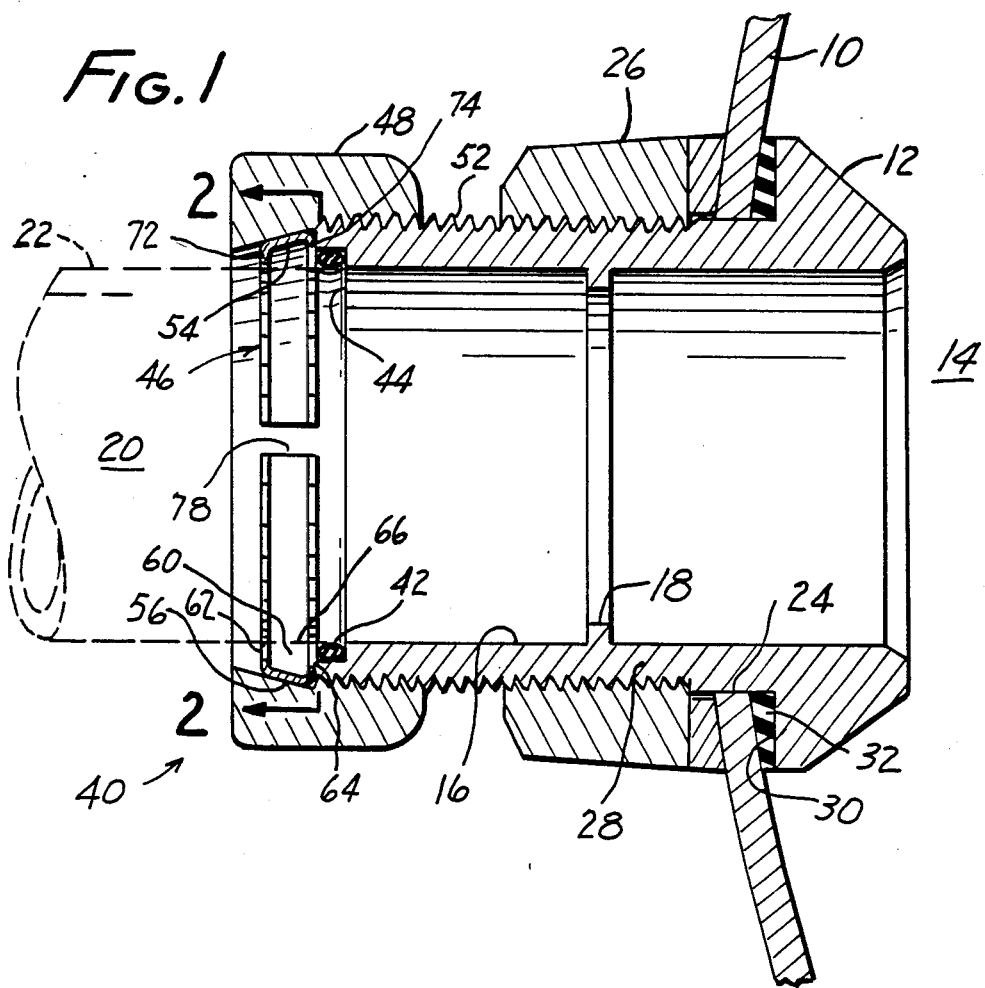
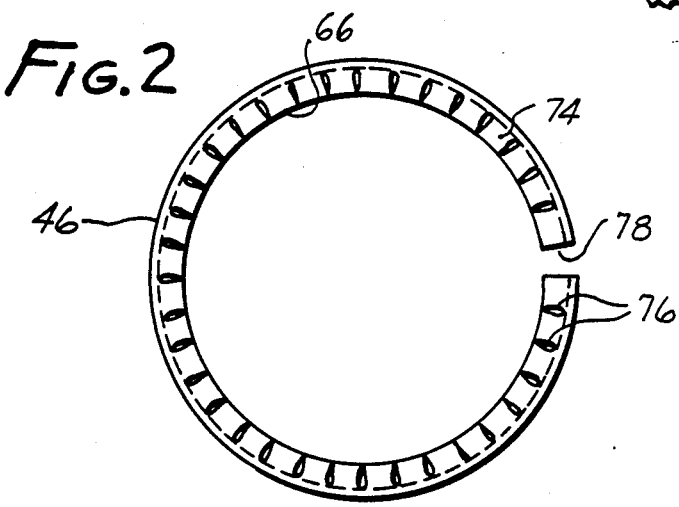

REVERSIBLE LOCK AND SEAL APPARATUS

This invention has to do with locking and sealing apparatus for intercommunicating tubular elements such as recreational pool piping and fittings which need to be coupled water-tightly, usually permanently, but which frequently need adjustment during installation.

BACKGROUND OF THE INVENTION

Recreational pools such as swimming pools and spas involve considerable plumbing for water recirculation, filtration and heating. Typically synthetic organic plastic piping is used to carry the water. The various pieces of equipment used to process the water such as filters are provided with fittings having connection stubs for attachment of the piping. The mode of coupling the piping to the fittings typically is either by threaded connection between cooperating threaded portions on the parts to be coupled or by gluing slip-slip joints. The former techniques takes more time and requires tape or plumber's sealant to ensure a water tight seal, but threaded couples can be adjusted after first connection for adjustments that may become necessary. Gluing involves putting a solvent on the parts to be interfitted and sliding them together with a slight rotation. This type of joint is usually water-tight, but not always, and may otherwise be not properly adjusted. In case of leakage or maladjustment, the coupling cannot be simply taken apart but must be replaced.

SUMMARY OF THE INVENTION

It is accordingly an object of the invention to provide a novel means of coupling tubular elements together in a manner to be water-tight, to be easily assembled in the first instance and to be readily readjusted if necessary. It is a more specific object to provide a reversible lock and seal apparatus which is threadless in its connection to piping like gluing but post-coupling adjustible by mere reversal of the coupling action as in threaded connections.

It is a further object to provide a means of reducing the need for equipment manufacturers to provide different types of fittings for threaded or slip-slip connection on their recreational pool equipment.

These and other objects of the invention to become apparent hereinafter are realized in accordance with the invention by provision of a threadless, reversible lock and seal apparatus for coupling of intercommunicating coaxially disposed first and second liquid-carrying tubular elements such as swimming pool piping, in which the apparatus comprises a stiff ring generally U-shaped in transverse cross-section and sized to be slidably received open side inward by a first tubular element, the ring defining a first generally discontinuous cam surface at its open side, and a second generally continuous cam surface opposite its open side, and an annular follower adapted to engage the ring cam surface in ring diameter-reducing relation, the follower and said second tubular element defining cooperating means adapted to draw the discontinuous cam surface into camming engagement with the ring, whereby the ring discontinuous surface reversibly locks on the first tubular element to couple the first tubular element to the second tubular element.

In particular embodiments at least said first tubular element is synthetic organic plastic; the ring is of metal which is adapted to score said tubular elements; the follower is internally threaded, and the second tubular element is externally cooperatively threaded, the respective threads defining the cooperative means; there is also provided a separately formed sealing ring squeezed between the first tubular element and the second tubular element in seal-defining relation by the follower; the ring is a frusto-conical split ring and the aid follower defines a congruent conical section adapted to overlie the ring in inwardly camming relation; and the first generally discontinuous cam surface comprises parallel circular series of teeth, said second generally continuous cam surface comprises a longitudinally split conical section the camming closure of which drives said teeth angularly inward into locking engagement with said first tubular element.

In a particularly preferred embodiment, there is provided a threadless, reversible lock and seal apparatus for coupling coaxially disposed recreational pool piping with pool equipment fittings, the apparatus comprising a stiff ring generally U-shaped in transverse cross-section and sized to be slidably received U-open side inward by the piping, the U-legs of the ring defining parallel series of circularly arranged teeth adapted to individually locally surface engage opposing piping, the U-closed end defining a cam surface, and means to secure the ring to the equipment fitting in water-sealed relation including a cam follower adapted to cam said teeth into locking piping engagement responsive to follower securement to the fitting.

In this preferred embodiment, typically, the piping is synthetic organic plastic and the ring metal adapted to score the plastic piping; the ring comprises parallel rows of teeth connected by the closed end camming surface; the cam follower is internally threaded, and the second tubular element is externally cooperatively threaded, the threads defining the cooperative means; the fitting defines an aunular sealing flange, and including also a separately formed sealing ring squeezed between the sealing flange and the piping in seal-defining relation; the ring is a frusto-conical split ring and the follower defines a congruent conical section adapted to overlie the ring in inwardly camming relation; and the ring teeth are relatively differentially circularly spaced between their roots and tips responsive to inward camming of said ring by said follower for nearly continuous circular engagement of said piping by said teeth in locked condition of said apparatus.

THE DRAWINGS

The invention will be further described as to an illustrative embodiment in connection with the attached drawings in which:

FIG. 1 is view in vertical section of the threadless, reversible lock and seal apparatus of the invention; and FIG. 2 is a view in elevation of the locking ring taken on line 2—2 in FIG. 1.

PREFERRED MODES

The invention provides a threadless, reversible lock and seal apparatus for coupling swimming pool piping and fittings, comprising a frusto-conical U-cross section metal ring with longitudinally spaced circular rows of teeth, adapted to be cammed into piping by a follower coupled to the fitting for locking the piping to the fitting without need of piping threads or solvent cements, and squeezing a seal ring therebetween.

With reference now to the drawings in detail, a unit of swimming pool equipment such as a filter tank is represented by a portion of the filter tank wall 10. A fitting 12 is used to communicate the interior of the tank at 14 with external plumbing. The fitting 12 is molded synthetic organic plastic defining a slip receptacle 16 terminating at internal stop ring 18 for the interfitting slip end 20 of external piping 22. Fitting 12 extends through opening 24 in the wall 10 and is secured in place by nut 26 which is threaded onto shank 28 of the fitting drawing the fitting shoulder 30 into engagement with sealing gasket 32 and the wall 10 portion surrounding the opening 24.

The locking and sealing apparatus is generally shown at 40 and comprises a sealing ring, such as an O-ring 42 carried on inner flange 44 of the fitting 12, a cam ring 46 to be described in detail momentarily, and a follower 48. The follower 48 is internally threaded onto complementary cooperating external threads 52 on the fitting 12.

The follower 48 it will be noted is essentially an annular nut having a specially formed camming shoulder 54 inside. The camming shoulder 54 is congruent with the outer or camming surface 56 of the cam ring 46.

Turning the cam ring 46 and particularly FIG. 2 of the drawings, it will be noted that the cam ring is generally U-shaped in transverse cross-section, and is a split ring in horizontal cross section. The open side 60 of the cam ring 46 is defined by the respective legs 62, 64 of the U-shape ring and it is opposite the closed end of the U-shape ring, the outer surface of which defines the camming surface 56 of the cam ring 46. The legs 62, 64 are parallel to each other and terminate in a common annular plane indicated at 66 in FIG. 1. The legs 62, 64 are each comprised of a circular series of teeth 72, 74, formed by cutting a series of parallel kerfs 76 in the legs. When cut these kerfs 76 are of like cross-section throughout their length. In use they are closed, as illustrated in FIG. 2, at their outer end as will be explained presently. Here it may be noted that the closing up of the outer ends of the teeth 72, 74 to reduce the kerfs 76 effects an iris-like movement of the teeth as they are forced together and inward into the piping 22.

In assembling a coupling having the lock and seal apparatus of the invention, the follower 48 is engaged with the threads 52 and turned. The cam ring 46 is engaged by the camming shoulder 54 of the follower 48 and as follower turning progresses, the diameter of the cam ring is reduced as the cam ring moves into the smaller end of the annular shoulder. The diameter reduction is taken up by the split 78 in the ring and then by the kerfs 76 at the outer free ends of the teeth 72, 74. As turning progresses further the teeth 72, 74 are forced more together and inward into the plastic piping 22 surface. Because the cam ring 46 is metal of a hardness to score the plastic of the piping 22 the teeth dig in with their combined inward and slightly sideward movement. In effect the ring teeth 72, 74 self thread onto the piping. The O-ring seal 42 is compressed into tight engagement between the piping 22 and the shoulder 54 and secured there by leg 64. The result is a lock as permanent as one could want and tightly sealed.

But highly advantageously, the lock can be as easily undone as it was done, unlike glued joints, in case of misalignment of parts in the pool equipment installation for example. To do so, one merely reverse rotates the follower, taking the pressure off the cam ring amd allowing the teeth to flex off the piping. Some tooth marks will be found on the piping, but the piping is undamaged thereby.

Accordingly the foregoing objects of the invention to provide a novel means of coupling tubular elements together in a manner to be water-tight, to be easily assembled in the first instance and to be readily readjusted if necessary, to provide a reversible lock and seal apparatus which is threadless in its connection to piping like gluing but post-coupling adjustable by mere reversal of the coupling action as in threaded connections, to provide a means of reducing the need for equipment manufacturers to provide different types of fittings for threaded or slip-slip connection on their recreational pool equipment have been met by the described apparatus.

Having thus described the best mode known to me for carrying out my invention, my invention is not to be limited to the illustrative embodiments but only in accordance with the following claims.

I claim:

1. Reversible lock and seal apparatus for coupling of intercommunicating coaxially disposed first and second liquid-carrying tubular elements such as swimming pool piping, said apparatus comprising a stiff ring adapted to score said first tubular element, said ring being a frusto-conical, split ring, generally U-shaped in transverse cross-section and sized to be slidably received with the open side of the U-shaped ring facing radially inward adjacent said first tubular element, said ring defining a first generally discontinuous cam surface at its own open side comprising first and second parallel circular series of teeth axially spaced by the width of said ring and of different lengths in respective series as a function of the frusto-conical shape of said split ring to define a common bore, said ring defining a second generally continuous cam surface opposite its open side, and an annular follower defining a congruent frusto-conical section adapted to overlie said ring and by relative axial movement with respect thereto to engage said generally continuous ring cam surface in inwardly camming, ring closing relation, said follower and said second tubular element thereby defining cooperating means adapted to draw said discontinuous cam surface into camming engagement with said said first tubular element, whereby said ring discontinuous surface reversibly locks on said first tubular element to couple said first tubular element to said second tubular element.

2. Reversible lock and seal apparatus according to claim 1, in which at least said first tubular element is synthetic organic plastic.

3. Reversible lock and seal apparatus according to claim 1, in which said follower is internally threaded, and said second tubular element is externally cooperatively threaded, said threads defining said cooperative means.

4. Reversible lock and seal apparatus according to claim 1, including also a separately formed sealing ring squeezed between said first tubular element and said second tubular element in seal-defining relation by said follower.

5. Reversible lock and seal apparatus for coupling coaxially disposed recreational pool piping with pool equipment fittings, said apparatus comprising a stiff ring generally U-shaped in transverse cross-section which has U-legs joined at a closed U-end defining a cam surface, said legs defining an inwardly open U-side, said ring being sized to be slidably received U-open side inward by said piping, the U-legs of said ring defining parallel series of circularly arranged teeth, the teeth in each respective series being of the same length and different from the length of teeth in the other series as a function of the closed U-end shape defining the cam surface and adapted to individually surface engage opposing piping, and means to secure said ring to said equipment fitting in water-sealed relation including an internally threaded cam follower movable axially relative to said ring and adapted thereby to cam said teeth into said pool piping for engagement responsive to follower securement to said fitting.

6. Reversible lock and seal apparatus according to claim 5, in which said piping is synthetic organic plastic and said ring is metal adapted to score said plastic piping.

7. Reversible lock and seal apparatus according to claim 5, in which said cam follower is internally threaded, and said second tubular element is externally cooperatively threaded, said threads defining said cooperative means.

8. Reversible lock and seal apparatus according to claim 7, in which said fitting defines an annular sealing flange, and including also a separately formed sealing ring squeezed between said sealing flange and said piping in seal-defining relation.

9. Reversible lock and seal apparatus according to claim 8, in which said ring is a frusto-conical split ring and said follower defines a congruent conical section adapted to overlie said ring in inwardly camming relation.

10. Reversible lock and seal apparatus according to claim 7, in which said teeth are relatively differentially circularly spaced between their roots and tips responsive to inward camming of said ring by said follower for nearly continuous circular engagement of said piping by said teeth in locked condition of said apparatus.

* * * * *